United States Patent Office 3,524,844
Patented Aug. 18, 1970

3,524,844
EPIPODOPHYLLOTOXIN GLUCOSIDE DERIVATIVES
Camilla Keller-Juslen, Max Kuhn, Jany Renz, and Albert von Wartburg, Basel, Switzerland, assignors to Sandoz Ltd. (also known as Sandoz A.G.), Basel, Switzerland
No Drawing. Continuation-in-part of applications Ser. No. 569,793, July 29, 1966, and Ser. No. 600,735, Dec. 12, 1966. This application Dec. 6, 1967, Ser. No. 688,375
Claims priority, application Switzerland, Sept. 21, 1965, 13,016/65, 13,018/65; Dec. 13, 1966, 17,752/66, 17,753/66, 17,754/66, 17,755/66, 17,756/66, 17,759/66
Int. Cl. C07c 47/18
U.S. Cl. 260—210   25 Claims

ABSTRACT OF THE DISCLOSURE

There are provided 4'-demethyl-epipodophyllotoxin-$\beta$-D-(substituted) glucosides, e.g. 4'-demethyl-epipodophyllotoxin-$\beta$-D-ethylidene-glucoside, together with intermediates therefor and novel processes used in the production thereof. The 4'-demethyl-epipodophyllotoxin-$\beta$-D-glucoside derivatives have cytostatic activity as demonstrated particularly by a strong effect against experimental tumours.

---

This is a continuation in part of our applications Ser. Nos. 569,793 and 600,735, filed July 29, 1966, and Dec. 12, 1966, respectively and both now abandoned. The invention relates to new glucosides and their production.

The present invention provides compounds of general Formula I,

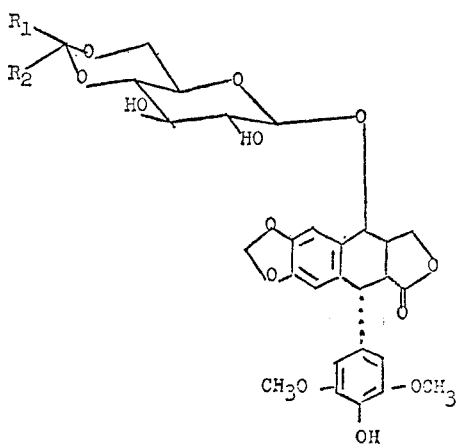

in which $R_1$ signifies a hydrogen atom, and
$R_2$ signifies an alkyl, alkenyl, cycloalkyl, 2-furyl or 2-thienyl radical, or an aryl, aralkyl or aralkenyl radical wherein the aromatic ring may optionally be substituted, preferably by one or more hydroxy, alkyl, alkoxy, nitro or halogen radicals, or each of
$R_1$ and $R_2$ signifies an alkyl radical, or
$R_1$ and $R_2$, together with the carbon atom to which they are attached, signify a saturated cycloaliphatic ring having 5 or 6 ring carbon atoms.

The present invention further provides a process for the production of compounds of general Formula I, characterized in that a 4'-demethyl-epipodophyllotoxin-$\beta$-D-glucoside of general Formula II,

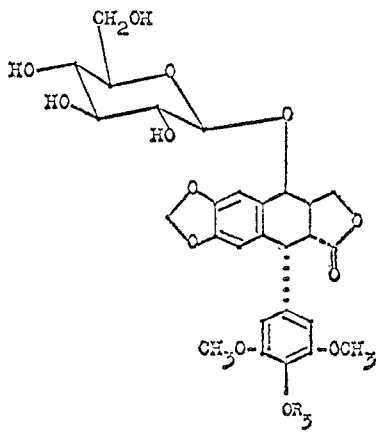

in which $R_3$ signifies a hydrogen atom or a carbobenzoxy radical, is reacted with a compound of general Formula III,

in which $R_1$ and $R_2$ have the above significance, or with a lower acetal or ketal thereof, in the presence of an acid, suitably a Lewis or sulphonic acid, catalyst, and any carbobenzoxy radical which may be present is subsequently split off.

The reaction is usually desirably carried out in the absence of moisture. It is also often desirable to carry out the reaction in the absence of oxygen, e.g. by providing a nitrogen atmosphere.

Suitable Lewis acid catalysts include anhydrous zinc chloride. Suitable sulphonic acid catalysts include p-toluenesulphonic acid and dried cation exchange resins with sulphonic acid radicals in the H+ form. Dimethylacetal, diethylacetal, the cyclic ethylene acetal or the corresponding ketals may be used as acetals or ketals of the compounds of general Formula III. It is preferred, in order to obtain a higher yield from the condensation, to remove the resulting reaction water or the resulting lower alcohol by azeotropic distillation in a vacuum at a low temperature (e.g. 20° to 30° C.) or, in the case where water of reaction is formed, to use a catalyst which also has water-binding properties.

The process of the invention may, for example, be effected by adding a 4'-demethyl-epipodophyllotoxin-$\beta$-D-glucoside of general Formula II to a compound of general Formula III or to the corresponding lower acetal or ketal, and then adding the catalyst, in the absence of moisture and optionally in an atmosphere of nitrogen. It is also possible, however, to dissolve or suspend a compound of general Formula II in a dry inert solvent, e.g. nitromethane, and to react this solution or suspension with a compound of general Formula III or with the corresponding lower acetal or ketal in the presence of the catalyst, optionally in an atmosphere of nitrogen. Condensation usually takes place at a temperature of 20° to 35° C. and is completed after half an hour to twenty hours. For purposes of isolation the reaction mixture may be taken up in a water-immiscible solvent, e.g. chloroform, optionally after filtering off the catalyst, and is optionally shaken out several times with water in order to remove water-soluble catalysts and by-products. The organic phase may subsequently be dried and concentrated by evaporation in a vacuum. The residue may then be liberated from an excess amount of a compound of general Formula III or of the corresponding lower acetal or ketal by digesting or macerating with pentane, petroleum ether or hexane, or directly by preliminary chromatography. The crude condensation product may then be purified in manner known per se by a subsequent chromatography and/or recrystallization or reprecipitation. Any carbobenzoxy radical which may still be present after condensation is split off in manner known per se, e.g., by hydrogenolysis.

4'-demethyl-epipodophyllotoxin-β-D-glucosides of Formula II

The starting 4'-demethyl-epipodophyllotoxin-β-D-glucosides of Formula II are new and they and their preparation form part of the present invention. They may be prepared as follows:

The carbobenzoxy radical is split off hydrogenolytically from tetra-O-acetyl-4'-carbobenzoxy - 4' - demethyl-epipodophyllotoxin-β-D-glucoside of Formula IV,

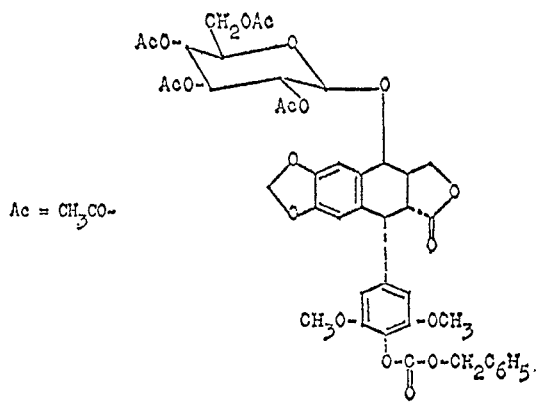

IV and the resulting tetra-O-acetyl-4'-demethyl-epipodophyllotoxin-β-D-glucoside of Formula V,

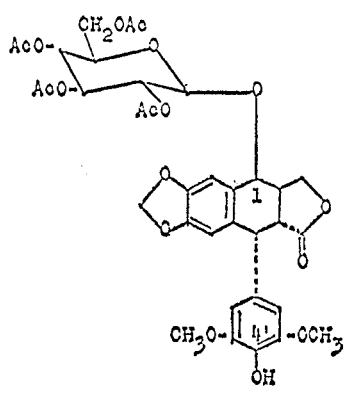

V is subjected to alcoholysis in the presence of anhydrous zinc acetate, whereby 4'-demethyl-epipodophyllotoxin-β-D-glucoside is obtained, or the acetyl radicals are first split off from tetra-O-acetyl-4'-carbobenzoxy-4'-demethyl-epipodophyllotoxin-β-D-glucoside by alcoholysis in the presence of anhydrous zinc acetate and optionally also sodium acetate, whereby 4'-carbobenzoxy-4'-demethyl-epipodophyllotoxin-β-D-glucoside results. The latter may, if desired, be converted to 4'-demethyl-epipodophyllotoxin glucoside by subsequent removal of the carbobenzoxy radical by hydrogenolysis.

Hydrogenolysis

Hydrogenolysis is effected in manner known per se; advantageously, at normal pressure and at 20° C. to a maximum of 40° C. in the presence of a palladium catalyst, e.g. palladium on charcoal or on barium sulphate. An alcohol, e.g. methanol or ethanol, is preferably used as solvent, with the addition of 0.5 to 5% by volume of glacial acetic acid and 10 to 50% by volume of acetone. The amount of catalyst used is 1 to 5% by weight, calculated on the compound used.

Alcoholysis

As it is known that lignan glucosides undergo epimerisation by the action of bases, and that the action of acids leads to decomposition with the splitting off of the sugar radical, it was not to be expected that the free glucoside could be produced from tetra-O-acetyl-4'-carbobenzoxy-4'-demethyl-epipodophyllotoxin-β-D-glucoside or tetra-O-acetyl-4'-demethyl - epipodophyllotoxin-β-D-glucoside by splitting off the acetyl radicals.

It has now surprisingly been found that the acetyl radicals may be split off from tetra-O-acetyl-4'-carbobenzoxy-4'-demethyl-epipodophyllotoxin-β-D-glucoside or tetra-O-acetyl-4'-demethyl-epipodophyllotoxin - β - D-glucoside without a simultaneous epimerisation of the aglucone at the C-3 atom and without a splitting off of the entire sugar radical, by subjecting these compounds to alcoholysis, preferably with methanol, in the presence of anhydrous zinc acetate.

Methanolysis is effected in anhydrous methanol at reflux temperature. The amount of catalyst used is about 20 to 50% by weight of the amount of tetra-O-acetyl-4'-demethyl-epipodophyllotoxin-β-D-glucoside used. The reaction time is between 15 and 30 hours. The use of zinc acetate as catalyst for methanolysis of tetra-O-acetyl-4'-demethyl-epipodophyllotoxin-β-D-glucoside yields a precipitate during the course of the reaction. Working up is effected by dissolving this precipitate by the addition of acetic acid whilst heating slightly. After evaporating the solvent, the residue is dissolved in a mixture of chloroform and butanol and the zinc salt is removed by shaking out with water. After concentrating by evaporation the organic phase yields crude 4'-demethyl-epipodophyllotoxin-β-D-glucoside, which is purified in manner known per se, e.g. by chromatography and/or crystallization.

The splitting off of the protective radicals may, however, also be effected in inverse order, in that tetra-O-acetyl-4'-carbobenzoxy - 4' - demethyl-epipodophyllotoxin-β-D-glucoside is boiled at reflux in the presence of anhydrous zinc acetate and optionally with the addition of anhydrous sodium acetate in methanol, until the splitting off the acetyl radical has been completed, in which case the carbobenzoxy radical is also partially split off simultaneously. The hitherto unknown 4'-carbobenzoxy-4'-demethyl-epipodophyllotoxin-β-D-glucoside of Formula VI,

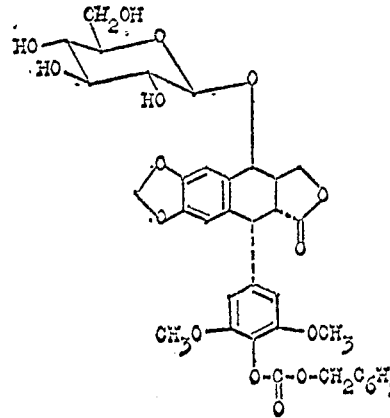

VI may then be isolated from the resulting mixture of the reaction components and Compound VI is converted into 4'-demethyl-epipodophyllotoxin-β-D-glucoside by hydrogenolysis of the carbobenzoxy radical.

Tetra-O-acetyl-4'-carbobenzoxy-4'-demethyl-epipodophyllotoxin-β-D-glucoside (Formula IV)

The tetra-O-acetyl-4'-carbobenzoxy-4'-demethyl-epipodophyllotoxin-β-D-glucoside used for the production of 4'-demethyl-epipodophyllotoxin-β-D-glucoside is also new and together with the process for its production forms part of the present invention. It may be produced as follows:

4'-carbobenzoxy-4'-demethyl-epipodophyllotoxin of Formula VII

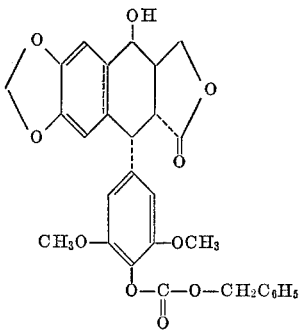

VII is condensed with α-acetobromoglucose of Formula VIII

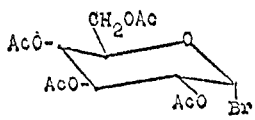

VIII in an organic solvent which is inert under the reaction conditions and in the presence of zinc oxide or mercury oxide, or 4'-carbobenzoxy-4'-demethyl-epipodophyllotoxin (Formula VII) or 4'-carbobenzoxy-4'-demethyl-podophyllotoxin of Formula IX

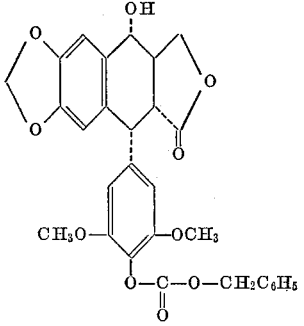

IX is condensed with 2,3,4,6-tetra-O-acetyl-β-D-glucose of Formula X

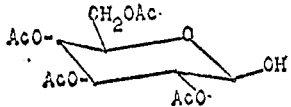

X in the presence of boron trifluoride ethyl etherate, in an organic solvent which is inert under the reaction conditions, at a temperature below 0° C.

Condensation with α-acetobromoglucose

It was not possible to obtain tetra-O-acetyl-4'-carbobenzoxy-4'-demethyl-epipodophyllotoxin-β-D-glucoside in a good yield from 4'-carbobenzoxy-4'-demethyl-epipodophyllotoxin and α-acetobromoglucose in the usual manner, e.g. under the conditions of the Koenigs-Knorr synthesis in benzene with the addition of a silver salt (e.g. $Ag_2O$ or $Ag_2CO_3$) or in acetonitrile, in the presence of $$Hg(CN)_2$$

It was surprisingly found that tetra-O-acetyl-4'-carbobenzoxy-4'-demethyl-epipodophyllotoxin - β - D-glucoside may be obtained in a good yield by reacting 4'-carbobenzoxy - 4' - demethyl-epipodophyllotoxin with α-acetobromoglucose in an organic solvent which is inert under the reaction conditions and in the presence of mercury-II-oxide, or preferably zinc oxide.

One preferred method of effecting this process consists in that 4'-carbobenzoxy-4'-demethyl-epipodophyllotoxin is reacted with α-acetobromoglucose in a suitable solvent, e.g. ethylene chloride or preferably acetonitrile, at a temperature of 20° to 80° C., preferably between 40° and 70° C., in the presence of mercury-II-oxide or zinc oxide. The reaction time, which depends on the temperature, concentration of the starting materials and grain size of the metal oxide, ranges from 0.5 to 12 hours. A 2- to 4-fold molar excess of α-acetobromoglucose is used in order to obtain a high conversion of 4'-carbobenzoxy-4'-demethyl-epipodophyllotoxin during glucosidation. The metal oxide is used in the same molar amount as α-acetobromoglucose. The initial concentration of 4'-carbobenzoxy-4'-demethyl-epipodophyllotoxin in the solvent should be between 5 and 20% by weight. The reaction is completed after 40 to 60 minutes under these conditions.

Tetra-O-acetyl-4'-carbobenzoxy - 4' - demethyl-epipodophyllotoxin-β-D-glucoside is isolated by filtering off the excess metal oxide, distilling off most of the solvent in a vacuum and washing the residue with a sodium bromide solution to remove mercury salts or with water/methanol (9:1) to remove zinc salts. Most of the decomposition product is removed from the excess α-acetobromoglucose by subjecting the reaction mixture to preliminary chromatography or by extracting with 5 to 30% aqueous ethanol at an elevated temperature. For further purification the main fractions of the preliminary chromatogram are chromatographed once again or the ethanol-insoluble residue is chromatographed on silica gel.

The pure glucoside fractions are combined and after drying in a high vacuum yield crude tetra-O-acetyl-4'-carbobenzoxy - 4' - demethyl-epipodophyllotoxin-β-D-glucoside which is purified by further chromatography.

Condensation with 2,3,4,6-tetra-O-acetyl-β-D-glucose

It has surprisingly been found that the reaction of 2,3,4,6-tetra-O-acetyl-D-glucose in the form of its pure β-anomer -with 4'-carbobenzoxy-4'-demethyl-podophyllotoxin or with 4'-carbobenzoxy-4'-demethyl-epipodophyllotoxin in the presence of boron trifluoride ethyl etherate, at a temperature below 0° C., in a solvent which is inert under the reaction conditions, yields tetra-O-acetyl-4'-carbobenzoxy-4'-demethyl-epipodophyllotoxin - β - D - glucoside in a high yield, in which case the final product may be readily isolated with a high degree of purity.

It should be noted that the configuration of the OH radical on the C–1 atom of the aglucone is of no importance, in that, irrespective of whether 4'-carbobenzoxy-4'-demethyl-podophyllotoxin or 4'-carbobenzoxy-4'-demethyl-epipodophyllotoxin is used as starting material, the 4'-carbobenzoxy - 4' - demethyl-epipodophyllotoxin-glucoside is always obtained.

In the light of what was hitherto known it could not be foreseen that practically only the β-glucoside compound would result as final product in the reaction described above. It could also not be foreseen that the readily affected 2,3,4,6-tetra-O-acetyl-β-D-glucose would not undergo an anomerisation or only a very slight anomerisation to the α-anomer under the indicated reaction conditions, especially in the presence of boron trifluoride ethyl etherate.

It is furthermore surprising that the reaction of 2,3,4,6-tetra-O-acetyl-β-D-glucose in the presence of boron trifluoride ethyl etherate with 4'-carbobenzoxy-4'-demethylepipodophyllotoxin or with 4'-carbobenzoxy-4'-demethyl-podophyllotoxin leads to the same final product, i.e. almost exclusively tetra-O-acetyl-4'-carbobenzoxy-4'-demethyl-epipodophyllotoxin-β-D-glucoside. Only traces of the corresponding glucoside of 4'-carbobenzoxy-4'-demethyl-podophyllotoxin are formed.

One preferred method of effecting the process consists in that boron trifluoride ethyl etherate is added at −10° to −25° C. to a solution or suspension of 4'-carbenzoxy-4'-demethyl-epipodophyllotoxin or 4'-carbobenzoxy-4'-demethyl-podophyllotoxin and 2,3,4,6-tetra-O-acetyl-β-D-glucose in a solvent which is inert under the reaction conditions, e.g. ethylene chloride, chloroform or methylene chloride. In order that the valuable aglucones may react quantitatively, 1.5 to 3 mols of 2,3,4,6-tetra-O-acetyl-β-D-glucose and 2 to 4 mols of boron trifluoride ethyl etherate are used for every mol of the aglucone. The initial concentration of 4'-carbobenzoxy-4'-demethyl-epipodophyllotoxin or 4'-carbobenzoxy-4'-demethyl-podophyllotoxin in the solvent should be approximately 25 to 40%.

Tetra-O-acetyl-4'-carbobenzoxy-4'-demethyl - epipodophyllotoxin -β-D-glucoside is isolated by inactivating the boron trifluoride ethyl etherate by the addition of a tertiary organic base, preferably pyridine, and the boron trifluoride/pyridine complex is subsequently washed out with water. The mixture of 2,3,4,6-tetra-O-acetyl-β-D-glucose and condensation product resulting after evaporating the organic solvent is liberated from unconverted tetraacetylglucose by precipitating in aqueous ethanol. A small amount of an undesired, difficultly soluble by-product is removed by taking up the precipitate in methanol, filtering the solution and removing the methanol in a vacuum. The resulting tetra-O-acetyl-4'-carbobenzoxy-4'-demethyl-epipodophyllotoxin - β - D - glucoside is pure enough for the following reaction stages. It may be obtained in analytically pure form by crystallization from benzene/pentane or benzene/cyclohexane.

4' - carbobenzoxy-4'-demethyl-podophllotoxin (Formula IX), and 4' - carbobenzoxy-4'-demethylepipodophyllotoxin (Formula VII)

The 4'-carbobenzoxy-4'-demethyl-podophyllotoxin and 4'-carbobenzoxy - 4' - demethyl-epipodophyllotoxin used for the production of tetra-O-acetyl-4'-carbobenzoxy-4'-demethyl-epipodophyllotoxin-β-D-glucoside are also new, and together with the process for their production form part of the present invention. They may be produced as follows:

4'-demethyl-podophyllotoxin of Formula XI

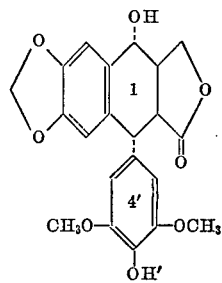

or 4'-demethyl-epipodophyllotoxin of Formula XII

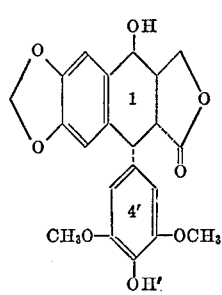

is reacted at a temperature of −20° to −50° C. with chloroformic acid benzyl ester in the presence of a tertiary organic base in an anhydrous organic solvent which is inert under the reaction conditions, to give 4'-carbobenzoxy-4'-demethyl-podophyllotoxin or 4'-carbobenzoxy-4'-demethyl-epipodophyllotoxin.

It was hitherto not possible to introduce protective radicals, e.g. acyl radicals or the tetrahydropyranyl radical, selectively on the phenolic OH radical in the 4'-position of 4'-demethyl-epipodophyllotoxin and 4'-demethyl-podophyllotoxin. Thus, for example, the usual acetylation of the 4'-demethyl-podophyllotoxin or 4'-demethyl-epipodophyllotoxin yields the 1,4'-diacetyl derivative. It is not possible to effect a direct selective splitting off of the protective radical in the 1-position in the case of these 1,4'-diesters.

A selective etherification takes place, however, by the reaction of 4'-demethyl-podophyllotoxin or 4'-demethyl-epipodophyllotoxin with dihydropyran, but this etherification takes place in the 1-position instead of the C-4'-position.

It has now surprisingly been found that it is possible to obtain a derivative of 4'-demethyl-podophyllotoxin or 4'-demethylepipodophyllotoxin with a protected hydroxyl radical in the 4'-position and a free hydroxyl radical in the 1-position, namely 4'-carbobenzoxy-4'-demethyl-epipodophenyllotoxin and 4'-carbobenzoxy-4'-demethyl-podophyllotoxin, as described below.

One preferred method of producing 4'-carbobenzoxy-4'-demethyl-epipodophyllotoxin consists in that finely pulverized 4'-demethyl-epipodophyllotoxin in ethylene chloride, methylene chloride or chloroform is reacted at a temperature of −5° to −15° C. with chloroformic acid benzyl ester in the presence of a tertiary organic base, e.g. pyridine or dimethyl aniline, in which case 1 to 1.35 mols of chloroformic acid benzyl ester are used for every mol of 4'-demethyl-epipodophyllotoxin to avoid the formation of large quantities of the 1,4'-bis-carbobenzoxy compound. The separation of the resulting 4'-carbobenzoxy-4'-demethyl-epipodophyllotoxin from the reaction mixture, which also contains unconverted 4'-demethyl-epipodophyllotoxin and small amounts of 1,4'-bis-carbobenzoxy-4'-demethyl-epipodophyllotoxin, is effected in manner known per se, e.g. by crystallization or chromatography. The preferred method of producing the corresponding podophyllotoxin compound is analogous but using 1 to 1.6 mols of chloroformic acid benzyl ester per mol of 4'-demethyl-podophyylotoxin.

The 4'-demethyl-epipodophyllotoxin used as starting material may be produced by the following process which itself forms part of the present invention: Podophyllotoxin is reacted with hydrogen bromide or hydrogen chloride, the resulting epipodophyllotoxin halide of Formula XIII,

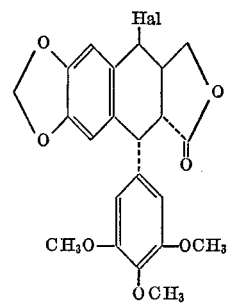

in which Hal signifies a chlorine or bromine atom, is treated with hydrogen bromide and the resulting 4'-demethyl-epipodophyllotoxin bromide of Formula XIV,

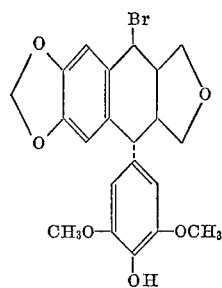

XIV is hydrolyzed.

It was hitherto not possible to effect a selective ether-splitting in the 4'-position of epipodophyllotoxin or podophyllotoxin. Surprisingly it has now been found that a selective ether-splitting in the 4'-position of epipodophyllotoxin halides of general Formula II, which are extremely sensitive to the action of hydrogen halides, may be effected with hydrogen bromide. As a result it is possible to produce 4'-demethyl-epipodophyllotoxin by a simple process from the readily obtainable podophyllotoxin.

One method of effecting the process consists in that podophyllotoxin is treated with hydrogen bromide gas or hydrogen chloride gas in an inert solvent, e.g. ethylene chloride, chloroform or methylene chloride, containing some ether, at −20° to +40° C., preferably at 0° C. The resulting solution of epipodophyllotoxin halide is then again treated with hydrogen bromide gas under the conditions indicated above. The production of 4'-demethyl-epipodophyllotoxin bromide is preferably effected in a single process in that podophyllotoxin is reacted directly with hydrogen bromide.

After washing out the excess hydrogen bromide with water, drying the organic phase and evaporating in a vacuum, 4'-demethyl-epipodophyllotoxin bromide may be purified by crystallization from an inert solvent, e.g. acetone, a mixture of acetone and ether, a mixture of acetone and a hydrocarbon or a halogenated hydrocarbon. The pure 4'-demethyl-epipodophyllotoxin bromide is subsequently dissolved in a mixture of water and a water miscible organic solvent which does not react with 4' - demethyl-epipodophyllotoxin bromide, e.g. acetone, and hydrolyzed at a reaction temperature between 20° and 80° C. in the presence of a proton acceptor. Proton acceptors which may be used are the salts of weak acids, the aqueous solutions of which give a neutral reaction or such a weak basic reaction that no epimerization of the lactone ring on the C atom in the 3-position occurs, and the anions of which do not participate in undesired exchange reactions with the bromine atom, e.g. barium carbonate and calcium carbonate.

4'-demethyl-epipodophyllotoxin may be isolated in manner known per se and subsequently purified, e.g. by crystallization or chromatography.

The 4' - demethyl-epipodophyllotoxin may alternatively be obtained by epimerization of 4'-demethyl-podophyllotoxin (see Example 30).

The compounds of Formula I are useful because they possess cytostatic activity, as demonstrated by their effect towards experimental tumours and, in vitro, on mastocytoma cells. In particular, they have a strong effect against the experimental tumour, leukemia L–1210, in the mouse. In this test, the results obtained do, of course, vary depending on the compound employed and mode of administration. However, in general satisfactory results are obtained when the compounds are administered intra-peritoneally in a single daily dose of from about 1 mg. to about 15 mg./kg. of mouse bodyweight. However, for optimum results with 4'-demethyl-epipodophyllotoxin-β-D-(m-hydroxy-benzylidene)-glucoside a single dose of about 32 mg./kg. is required.

For such administration the compounds are worked up with physiologically inert liquids such as water, alcohols, glycerin and vegetable oils.

With regard to the references to the radicals alkyl, alkenyl, aralkyl, aralkenyl and alkoxy in the definitions of $R_1$ and $R_2$, it is preferred that the said alkyl, alkenyl and alkoxy radicals have no more than 10 carbon atoms and the said aralkyl and aralkenyl radicals no more than 16 carbon atoms (excluding any carbon atom-containing substituents in the aromatic ring).

The term "in manner known per se" as used herein designates methods in use or described in the literature on the subject.

In the following non-limitative examples all temperatures are indicated in degrees centigrade. The melting or decomposition points were determined on a Kofler block.

EXAMPLE 1

4'-demethyl-epipodophyllotoxin-β-D-ethylidene-glucoside 1.5 g. of dry 4'-demethyl-epipodophyllotoxin-β-D-glucoside are suspended in 30 cc. of nitromethane, and 6 cc. of acetaldehyde-dimethylacetal and 150 mg. of p-toluenesulphonic acid are added. The mixture is stirred at room temperature in an atmosphere of nitrogen and in the absence of moisture for 1 hour. After this time the initial suspension has turned into a clear solution, and no starting material can be detected in the thin layer chromatogram (silica gel plates, eluant: chloroform +6% of methanol). Working up is effected by diluting with 400 cc. of chloroform and shaking out thrice with 25 cc. each of water. The crude material obtained after concentrating the dried organic phase by evaporation is subsequently chromatographed on 100 g. of silica gel "Merck" (grain size 0.05 to 0.2 mm.), whereby chloroform containing 6% of methanol is continuously used as eluant. 4'-demethyl-epipodophyllotoxin - β - D-ethylidene-glucoside, which is uniform according to thin layer chromatography, is obtained. After recrystallization from methanol colourless crystals having a M.P. of 236–251°, $[\alpha]_D^{22} = -110.5°$ (c.=0.588 in chloroform), are obtained.

EXAMPLE 2

4'-demethyl-epipodophyllotoxin-β-D-propylidene-glucoside 1.5 g. of dry 4'-demethyl-epipodophyllotoxin-β-D-glucoside are suspended in 25 cc. of nitromethane, and 1 cc. of propionaldehyde and 125 mg. of p-toluenesulphonic acid are then added. The mixture is stirred at room temperature in an atmosphere of nitrogen and in the absence of moisture for 2 hours. After this time the initial suspension is almost clear and almost no starting material can be detected in the thin layer chromatogram (silica gel plates, eluant: chloroform +15% of methanol). Working up is effected by diluting with 500 cc. of chloroform and shaking out four times with 25 cc. each of water. The neutral organic phase is dried over sodium sulphate and concentrated by evaporation in a vacuum.

The crude material is subsequently chromatographed on 100 g. of silica gel "Merck" (grain size 0.05 to 0.2 mm.), whereby chloroform containing 2% of methanol is continuously used as eluant. The fractions which are uniform in accordance with the thin layer chromatogram are recrystallized from 10 cc. of hot methanol and yield 4'-demethyl-epipodophyllotoxin-β-D-propylidene - glucoside in the form of a colourless crystalline preparation having a M.P. of 178–182°, $[\alpha]_D^{20} = -107.2°$ (c.=0.558 in chloroform).

The following table gives a number of other hitherto unknown compounds which were synthesized in a manner analogous to that indicated in Example 2, the properties of these compounds and the starting materials used in each case.

| Compound | Produced from 4'-demethyl-epipodophyllotoxin-β-D-glucoside and | M.P., degrees | Optical rotation |
|---|---|---|---|
| 4'-demethyl-epipodophyllotoxin-β-D-butylidene-glucoside. | n-Butyraldehyde | 170–176 | $[\alpha]_D^{22} = -100.1°$ (c.=0.754 in chloroform). |
| 4'-demethyl-epipodophyllotoxin-β-D-isobutylidene-glucoside. | Isobutyraldehyde | 181–185 | $[\alpha]_D^{24} = -96.9°$ (c.=0.722 in chloroform). |
| 4'-demethyl-epipodophyllotoxin-β-D-pivalylidene-glucoside. | Pivalaldehyde | 162–165/173–177 | $[\alpha]_D^{20} = -96.5°$ (c.=0.775 in chloroform). |
| 4'-demethyl-epipodophyllotoxin-β-D-pentylidene-glucoside. | Valeraldehyde | 234–251 | $[\alpha]_D^{22} = -101.9°$ (c.=0.710 in chloroform). |
| 4'-demethyl-epipodophyllotoxin--D-(2-methylpentylidene)-gulcoside. | 2-methylpentanal | 143–150 | $[\alpha]_D^{23} = -100.9°$ (c.=1.004 in chloroform). |
| 4'-demethyl-epipodophyllotoxin-β-D-hexylidene-glucoside. | n-Hexanal | 219–238 | $[\alpha]_D^{23} = 158.3°$ (c.=0.757 in pyridine). |

EXAMPLE 3

4'-demethyl-epipodophyllotoxin-β-D-(2-butenylidene)-glucoside 1 g. of dry 4'-demethyl-epipodophyllotoxin-β-D-glucoside is suspended in 20 cc. of nitromethane, and 20 cc. of crotonaldehyde (freshly distilled) and 2 g. of Dowex ion exchange resin (type 50 WX2, dry, dry contents 27%) are added. The reaction is effected in an atmosphere of nitrogen and in the absence of moisture at room temperature as indicated in Example 2. After 1 hour only one main spot can be detected in the thin layer chromatogram (eluant: chloroform +6% of methanol), and the mixture is worked up. The reaction mixture is filtered off from the ion exchange resin and this is subsequently washed well with chloroform. The filtrate is diluted with 500 cc. of chloroform and shaken out 4 times with 25 cc. each of water. The organic phase is filtered through sodium sulphate and is concentrated by evaporation in a vacuum, whereby a yellow oil is obtained, which is purified on 110 g. of silica gel "Merck." Choroform +2% of methanol is continuously used as eluant. The column chromatography yields 4' - demethyl - epipodophyllotoxin-β-D-(2-butenylidene)-glucoside, which is almost uniform according to the thin layer chromatogram (silica gel plates; eluant: chloroform +6% of methanol). The compound is recrystallized product is obtained, having a M.P. of 195–199°, $[\alpha]_D^{21} = -99.2°$ (c.=0.813 in chloroform).

EXAMPLE 4

4'-demethyl-epipodophyllotoxin-β-D-hexahydrobenzylidene-glucoside (a) From 4' - demethyl - epipodophyllotoxin - β-D-glucoside. 2.0 g. of 4'-demethyl - epipodophyllotoxin-β-D-glucoside are suspended in a solution of 2.0 cc. of hexahydrobenzaldehyde in 30 cc. of nitromethane. After the addition of 100 mg. of p-toluenesulphonic acid stirring is effected at 20° in the absence of moisture for 1 hour, 50 mg. of p-toluenesulphonic acid are added, and stirring is effected for a further 5 hours. Dilution is subsequently effected with 250 cc. of chloroform, the undissolved material is filtered off and the chloroform phase is washed with water until neutral. After drying the solution over sodium sulphate and concentrating by evaporation in a vacuum, the residue is chromatographed on silica gel. By-products and then pure 4'-demethyl-epipodophyllotoxin - β - D-hexahydrobenzylidene-glucoside are eluted with chloroform containing 2% of methanol. The compound is obtained in the form of crystals having a M.P. of 228–231° from ethanol, $$[\alpha]_D^{21} = -98.0°$$

(c.=1.020 in chloroform).

(b) From 4' - carbobenzoxy - 4' - demethyl-epipodophyllotoxin-β-D-glucoside. 5.6 g. of 4'-carbobenzoxy-4'-demethyl-epipodophyllotoxin-β-D-glucoside and 5 cc. of hexahydrobenzaldehyde are dissolved in 80 cc. of absolute, alcohol-free chloroform while heating slightly. After cooling the solution to 20°, 25 mg. of p-toluenesulphonic acid monohydrate are added, and stirring is effected at 20° in an atmosphere of nitrogen for 6 hours, whereby 30 cc. of absolute chloroform are added after each hour and are again distilled off in a vacuum. 1 cc. of hexahydrobenzaldehyde is subsequently added, and the mixture is allowed to react at 35° for 1 hour. 0.3 cc. of absolute pyridine are then added to the reaction mixture and washing is effected 4 times with 30 cc. each of water. The organic phase is dried over sodium sulphate and after concentrating by evaporation in a vacuum yields a crude product which is purified by chromatography on silica gel. By-products and then pure 4'-carbobenzoxy-4'-demethyl-epipodophyllotoxin - β - D-hexahydrobenzylidene-glucoside are eluted with chloroform containing 2% of methanol. The compound is obtained in the form of a colourless powder having a M.P. of 148–150°, $[\alpha]_D^{21} = -76.6°$ (c.=1.046 in chloroform).

The protective radical is removed by dissolving 2.75 g. 4' - carbobenzoxy - 4'-demethyl-epipodophyllotoxin-β-D-hexahydrobenzylidene-glucoside in 100 cc. of ethanol/acetone (2:1), adding 0.5 g. of palladium charcoal (10% Pd) and hydrogenating at 20° at atmosphere pressure until the splitting off of the carbobenzoxy radical has been completed. The catalyst is then filtered off, is washed with 50 cc. of hot acetone, and the filtrate is concentrated by evaporation in a vacuum. The residue is crystallized from acetone/ether and then from ethanol, whereby 4'-demethyl - epipodophyllotoxin-β-D-hexahydrobenzylidene-glucoside, having a M.P. of 226–230°, $[\alpha]_D^{21} = -98.6°$ (c.=1.066 in chloroform), is obtained.

EXAMPLE 5

4'-demethyl-epipodophyllotoxin-β-D-cyclopentylmethylene-glucoside 10.5 g. of 4' - carbobenzoxy-4'-demethyl-epipodophyllotoxin-β-D - glucoside and 7 g. of cyclopentane-carboxaldehyde are dissolved in 125 cc. of absolute alcohol-free chloroform while heating slightly. After cooling the solution to 20°, 40 mg. of p-toluenesulphonic acid monohydrate are added, and stirring is effected at 35° in an atmosphere of nitrogen for 6 hours, whereby 30 cc. of absolute chloroform are added after each hour and are again distilled off in a vacuum. 1 g. of cyclopentane-carboxaldehyde is subsequently added and the mixture is again allowed to react for 1 hour. 0.5 cc. of absolute pyridine are then added to the reaction mixture, and washing is effected 4 times with 30 cc. each of water. The organic phase is dried over sodium sulphate and after concentrating by evaporation in a vacuum yields a crude product which is purified by chromatography on silica gel. By-products and then pure 4'-carbobenzoxy-4'-demethyl - epipodophyllotoxin - β-D-cyclopentylmethylene-glucoside are eluted with chloroform containing 2% of methanol. After foaming from acetone and drying in a high vacuum at 80°, the compound is obtained as a colourless powder having a M.P. of 147–148°, $[\alpha]_D^{21} = -73.7°$ (c.=0.990 in chloroform).

The protective radical is removed by dissolving 8.4 g. of 4' - carbobenzoxy - 4' - demethyl-epipodophyllotoxin-β-D-cyclopentylmethylene-glucoside in 150 cc. of ethanol/acetone (2:1), adding 0.5 g. of palladium charcoal (10% Pd) and hydrogenating at 20° and atmospheric pressure. After the splitting off of the carbobenzoxy radical has been completed, the catalyst is filtered off, is washed with 50 cc. of warm acetone, and the filtrate is concentrated by evaporation in a vacuum. After crystallizing the residue twice from ethanol/ether, 4'-demethyl-epipodophyllotoxin - β - D - cyclopentylmethylene-glucoside, having a M.P. of 233–234°, is obtained. A crystalline form thereof, having a M.P. of 195–196°, $[\alpha]_D^{21} = -98.9°$ (c.=0.992 in chloroform), crystallizes from ethyl acetate.

EXAMPLE 6

4'-demethyl-epipodophyllotoxin-β-D-phenyl-ethylidene-glucoside 6 g. of Dowex ion exchange resin (type 50 WX2, dry) and 1.5 cc. of phenylacetaldehyde-dimethylacetal are added to a suspension of 1.5 g. of dry 4' - demethyl-epipodophyllotoxin-β - D - glucoside in 60 cc. of nitromethane. The mixture is stirred at room temperature in an atmosphere of nitrogen and in the absence of moisture. After about 1½ hours a clear solution results, and only traces of starting material can be detected in the thin layer chromatogram (eluant: chloroform +6% of methanol). The catalyst is filtered off and the light yellow filtrate is diluted with 0.75 cc. of pyridine (pH increase from 3–4 to 6) and 400 cc. of chloroform. Shaking out is then effected thrice with 25 cc. each of water. The organic phase is filtered through sodium sulphate and concentrated by evaporation in a vacuum. The crude product is cromatographed on 80 g. of silica gel "Merck," whereby a uniform material may be eluted with chloroform containing 1.5% of methanol (thin layer chromatography on silica gel plates, eluants: (a) chloroform +6% of methanol, (b) chloroform +30% of acetone). After recrystallization from chloroform/methanol, colourless 4' - demethyl - epipodophyllotoxin - β-D-phenyl-ethylidene-glucoside, having a M.P. of 165–170°, $[\alpha]_D^{25} = -82.0°$ (c.=0.971 in acetone), is obtained.

EXAMPLE 7

4'-demethyl-epipodophyllotoxin-β-D-hydrocinnamylidene-glucoside 1.5 g. of dry 4' - demethyl-epipodophyllotoxin-β-D-glucoside are suspended in 30 cc. of nitromethane, and subsequently 1.5 cc. of hydrocinnamaldehyde (freshly distilled) and 300 mg. of p-toluenesulphonic acid are added. The mixture is stirred at room temperature in an atmosphere of nitrogen and in the absence of moisture until a clear solution results (after 30 minutes). Working up is effected by diluting the reaction solution with 500 cc. of chloroform and shaking out 4 times with 25 cc. each of water. The neutral organic phase is dried over sodium sulphate and concentrated by evaporation in a vacuum. The residue is chromatographed on 100 g. of silica gel "Merck." Unconverted hydrocinnamaldehyde is removed by elution with choloroform. The following fractions (with chloroform +2% of methanol) yield uniform hydrocinnamylidene derivative, which after recrystallization from 5 cc. of hot ethanol yields pure 4' - demethyl - epipodopyllotoxin - β - D - hydrocinnamylidene-glucoside in the form of colourless prisms having a M.P. of 193–199°, $[\alpha]_D^{20} = -103.9°$ (c.=0.605 in chloroform).

EXAMPLE 8

4' - demethyl - epipodophyllotoxin-β-D-(o-nitro-cinnamylidene)-glucoside 6.0 g. of o-nitrocinnamaldehyde and 6.0 g. of Dowex ion exchange resin (type 50 WX2, dry) are added to a suspension of 1.5 g. of dry 4'-demethyl-epipodophyllotoxin-β-D-glucoside in 75 cc. of nitromethane, and stirring is effected in an atmosphere of nitrogen and in the absence of moisture. After about 2 hours a clear solution results and only small amounts of starting material are detected in the thin layer chromatogram (silica gel plates, chloroform containing 6% of methanol as eluant). Working up is effected by filtering off the catalyst and washing with chloroform. The combined filtrates are diluted with 400 cc. of chloroform and shaken out 3 times with 25 cc. each of water. The organic phase is dried over sodium sulphate and concentrated by evaporation. The resulting crude product is chromatographed on 100 g. of silica gel "Merck," whereby chloroform and then chloroform +2% of methanol is used as eluant. The fractions which are uniform in accordance with thin layer chromatography (tested on silica gel plates with chloroform +6% of methanol as eluant) are combined and recrystallized from 50 cc. of hot methanol. 4'-demethyl-epipodophyllotoxin-β-D-(o-nitro-cinnamylidene)-glucoside is obtained in the form of colourless crystals having a M.P. of 244–254°, $[\alpha]_D^{21} = -76.9°$ (c.=0.639 in acetone).

EXAMPLE 9

4'-demethyl-epipodophyllotoxin - β - D - cinnamylidene-glucoside 30 cc. of freshly distilled cinnamaldehyde are added to 1.5 g. of dry 4' - demethyl-epipodophyllotoxin-β-D-glucoside, and 3.0 g. of Dowex ion exchange powder (type 50 WX2, dry) are added. The mixture is stirred at room temperature in an atmosphere of nitrogen and in the absence of moisture. After 15 hours almost no starting material can be detected in the thin layer chromatogram (system: silica gel plates and chloroform +15% of methanol as eluant). After filtering off the catalyst and washing with chloroform, the concentrated filtrate is purified by column chromatography on 100 g. of silica gel "Merck." Unconverted cinnamaldehyde is eluted with chloroform and the remaining substance with chloroform +2% of methanol. A material which is uniform in accordance with thin layer chromatography is obtained. After recrystallization from 20 cc. of ethanol, 4'-demethyl-epipodophyllotoxin-β-D-cinnamylidene-glucoside, having a M.P. of 239–246°, $[\alpha]_D^{21} = -86.1°$ (c.=0.564 in acetone), is obtained.

EXAMPLE 10

4' - demethyl - epipodophyllotoxin-β-D-(p-fluorobenzylidene)-glucoside 0.25 g. of anhydrous zinc chloride are added to a solution of 0.5 g. of dry 4'-demethyl-epipodophyllotoxin-β-D-glucoside in 10 cc. of p-fluorobenzaldehyde, and shaking is effected at room temperature in an atmosphere of nitrogen and in the absence of moisture for 3 to 4 hours. After about 3 hours only traces of unconverted glucoside can be detected in the thin layer chromatogram (silica gel plates, eluant: chloroform +6% of methanol). Working up is effected by diluting the reaction solution with 30 cc. of chloroform and shaking out thrice with 10 cc. each of water. The chloroform phase is dried over sodium sulphate and concentrated by evaporation in a vacuum. The resulting oily residue is added dropwise while stirring to 150 cc. of pentane, whereby a flaky precipitate results. When the crude product separates in greasy form, it is dissolved in a small quantity of acetone and again precipitated by adding the solution dropwise to 150 cc. of fresh pentane. The crude condensation product is purified by chromatography on 100 g. of silica gel "Merck" (grain size 0.05 to 0.2 mm.). The primary fractions which are eluted with chloroform +2% of methanol yield uniform 4' - demethyl - epipodophyllotoxin-β-D-(p-fluorobenzylidene)-glucoside. Colourless crystals, having a M.P. of 265–270°, $[\alpha]_D^{20} = -105°$ (c.=0.509 in chloroform).

EXAMPLE 11

4' - demethyl-epipodophyllotoxin - β - D - salicylidene-glucoside 30 cc. of pure salicylaldehyde are added to 1.5 g. of dry 4' - demethyl-epipodophyllotoxin-β-D-glucoside, and 3.0 g. of Dowex ion exchange powder (type 50 WX2, dried at 120° in a high vacuum for 3 hours) are added. The air in the flask is removed with nitrogen and the reaction mixture is stirred at room temperature in the absence of moisture. The course of the condensation reaction is controlled by thin layer chromatography on silica gel plates with chloroform +15% of methanol as eluant.

After 5 hours the catalyst is filtered off and rewashed with chloroform. The concentrated filtrate is purified on 100 g. of silica gel "Merck" (grain size 0.02 to 0.2 mm.). After separating the salicylaldehyde (chloroform extract), the compound is eluted with chloroform +5% of methanol. A material which is uniform in accordance with thin layer chromatography is obtained. For purposes of analysis the compound is dissolved in 5 cc. of acetone and this solution is added dropwise while stirring to 100 cc. of pentane. 4' - demethyl - epipodophyllotoxin-β-D-salicylidene-glucoside is obtained in the form of a colourless amorphous powder, having a M.P. of 182–188°, $[\alpha]_D^{20}=-103.7°$ (c.=0.663 in chloroform).

The following table gives a number of other hitherto unknown compounds which were synthesized in a manner analogous to that indicated in Example 11, the properties of these compounds and the starting materials used in each case.

filtering the suspension and washing out the filter residue thrice with chloroform. The combined filtrates are then diluted with 300 cc. of chloroform and shaken out thrice with 25 cc. each of water. After drying over sodium sulphate and concentrating by evaporation, the organic phase yields a light yellow coloured residue which is chromatographed on 80 g. of silica gel for purification. The excess aldehyde is first removed by elution with chloroform and chloroform +2.5% of methanol. The later eluates obtained with chloroform containing 4% of methanol contain the condensation product which is uniform in accordance with thin layer chromatography. The crude compound is dissolved in 4 cc. of acetone and is added dropwise while stirring to 70 cc. of pentane, whereby 4'-demethyl-epipodophyllotoxin - β - D - (p-hydroxy-benzylidene)-glucoside precipitates as a colourless amorphous powder having a M.P. of 196–201°, $[\alpha]_D^{25}=-96.2°$ (c.=0.981 in methanol).

EXAMPLE 14

4'-demethyl-epipodophyllotoxin-β-D-(o-methyl-benzylidene)-glucoside 1.5 g. of dry 4'-demethyl-epipodophyllotoxin-β-D-glu-

| Compound | Produced from 4'-demethyl-epipodophyllotoxin-β-D-glucoside and | M.P., degrees | Optical rotation |
|---|---|---|---|
| 4'-demethyl-epipodophyllotoxin-β-D-(m-methoxy-benzylidene)-glucoside. | m-Methoxybenzaldehyde | 206–228 | $[\alpha]_D^{21}=-85.4°$ (c.=1.044 in acetone). |
| 4'-demethyl-epipodophyllotoxin-β-D-(o-chloro-benzylidene)-glucoside. | o-Chlorobenzaldehyde | 179–184 | $[\alpha]_D^{25}=-91.3°$ (c.=1.084 in chloroform). |
| 4'-demethyl-epipodophyllotoxin-β-D-(m-chloro-benzylidene)-glucoside. | m-Chlorobenzaldehyde | 173–176 | $[\alpha]_D^{23}=-107.7°$ (c.=0.803 in chloroform). |

EXAMPLE 12

4'-demethyl-epipodophyllotoxin-β-D-(o-methoxy-benzylidene)-glucoside 9 g. of o-methoxybenzaldehyde are dissolved in 60 cc. of nitromethane. 1.5 g. of dry 4'-demethyl-epipodophyllotoxin-β-D-glucoside and 150 mg. of p-toluenesulphonic acid are subsequently added. The gray-yellow suspension is stirred at room temperature in an atmosphere of nitrogen and in the absence of moisture. The course of the condensation reatcion is controlled by thin layer chromatography [system (a) chloroform +6% of methanol, (b) chloroform/methanol/water (70:25:5)]. After 5 hours only a small quantity of starting material is present, aside from the aldehyde condensation product and an impurity which runs somewhat slower. Working up is effected by diluting the reaction mixture with 500 cc. of chloroform and shaking out 4 times with 25 cc. each of water. The organic phase is filtered through sodium sulphate and concentrated by evaporation in a vacuum. An oily brown-yellow material is obtained, which is purified on 120 g. of silica gel "Merck." After separating the aldehyde (chloroform extract), the remaining substance is eluted with chloroform containing 2% of methanol. This chromatography yields the o-methoxy-benzylidene derivative which is completely uniform in accordance with thin layer chromatography. Recrystallization from 13 cc. of hot alcohol yields colourless crystals having a M.P. of 243–250°, $[\alpha]_D^{20}=-74.4°$ (c.=0.884 in acetone).

EXAMPLE 13

4'-demethyl-epipodophyllotoxin-β-D-(p-hydroxy-benzylidene)-glucoside 12 g. of p-hydroxybenzaldehyde, 4 g. of Dowex ion exchange resin (type 50 WX2, dry weight 26.4%) and 100 cc. of nitromethane are added to 2 g. of dry 4'-demethyl-epipodophyllotoxin-β-D-glucoside. The reaction mixture is stirred at room temperature in an atmosphere of nitrogen and in the absence of moisture, and the course of the condensation reaction is controlled by thin layer chromatography (silica gel plates, chloroform +15% of methanol as eluant). After about 3 hours the reaction has not yet been entirely completed. Working up is effected by coside are suspended in 30 cc. of nitromethane, and 9 cc. of o-toluylaldehyde and 150 mg. of p-toluenesulphonic acid are added. The mixture is stirred at room temperature in the absence of air and moisture. After 2 hours a clear solution results, and the starting material has almost disappeared in the thin layer chromatogram (eluant: chloroform +15% of methanol). Working up is effected by diluting the reaction solution with 500 cc. of chloroform and subsequently shaking out 4 times with 25 cc. each of water. The organic phase is dried over sodium sulphate and concentrated by evaporation. The residue is poured onto a column of 70 g. of silica gel "Merck." Unconverted o-toluyladlehyde is separated by eluation with chloroform. The following fractions (with chloroform +2% of methanol) yield the o-methyl-benzylidene derivative which is uniform in accordance with thin layer chromatography. For purposes of analysis the compound is dissolved in 3 cc. of acetone and this solution is added dropwise while stirring to 300 cc. of pentane. 4'-demethyl-epipodophyllotoxin - β - D - (o-methylbenzylidene)-glucoside is obtained as a colourless amorphous powder having a M.P. of 174–180°, $[\alpha]_D^{21}=-94.7°$ (c.=0.730 in chloroform).

EXAMPLE 15

4'-demethyl-epipodophyllotoxin-β-D-(m-hydroxy-benzylidene)-glucoside)

1.5 g. of dry 4'-demethyl-epipodophyllotoxin-β-D-glucoside and subsequently 150 mg. of p-toluenesulphonic acid are added to a solution of 9 g. of m-hydroxybenzaldehyde in 75 cc. of nitromethane. The yellowish suspension is stirred in an atmosphere of nitrogen and in the absence of moisture for 5 hours, whereby a clear solution results. Working up is effected by diluting the reaction solution with 500 cc. of chloroform and shaking out 5 times with 25 cc. each of water. The organic phase is filtered through sodium sulphate and concentrated by evaporation in a vacuum. A light yellow powdery substance is obtained, which is chromatographed on 110 g. of silica gel "Merck." After separating the aldehyde with chloroform +3% of methanol, the remaining substance is eluted with chloroform +6% of methanol. The fractions which are uniform in accordance with thin layer chromatography are dissolved in acetone, are subsequently concentrated in a vacuum to about 7 cc., and 20 cc. of ether are added. 4'-demethylepipodophyllotoxin - β - D - (m - hydroxy-benzylidene)-glucoside is obtained in the form of a colourless amorphous powder having a M.P. of 189–194°, $[\alpha]_D^{21}$=−99.9° (c.=0.766 in methanol).

EXAMPLE 16

4'-demethyl-epipodophyllotoxin-β-D-(m-nitrobenzylidene)-glucoside 30 g. of m-nitrobenzaldehyde are dissolved in 45 cc. of nitromethane and 1.5 g. of dry 4'-demethyl-epipodophyllotoxin-β-D-glucoside and 6 g. of Dowex ion exchange resin (type 50 WX2, dry) are subseqeuntly added. The mixture is stirred at room temperature in an atmosphere of nitrogen and in the absence of moisture. After 1 hour only a small amount of starting material is present in the thin layer chromatogram (eluant: chloroform +6% of methanol). Working up is effected by filtering off the catalyst and washing the filtrate with chloroform. The dark-coloured filtrate is diluted with 400 cc. of chloroform and shaken out thrice with 25 cc. each of water. The chloroform phase is dried over sodium sulphate and concentrated by evaporation. A liquid is obtained which gradually crystallizes. The crude material is dissolved in 30 cc. of chloroform and chromatographed on 120 g. of silica gel "Merck." After separating the aldehyde (chloroform extract), the remaining substance is eluted with chloroform +2% of methanol. This chromatographic purification yields a material which is uniform in accordance with thin layer chromatography. For purposes of analysis the compound is dissolved in 20 cc. of acetone and this solution is added dropwise to 100 cc. of pentane. A light yellow amorphous powder, having a M.P. of 178–185°, $[\alpha]_D^{21}$=−77.5° (c.=0.831 in acetone), is obtained.

EXAMPLE 17

4'-demethyl-epipodophyllotoxin-β-D-(p-methylbenzylidene)-glucoside 1.5 g. of 4'-demethyl-epipodophyllotoxin-β-D-glucoside are suspended in 30 cc. of nitromethane, 9 cc. of p-toluylaldehyde and 75 mg. of p-toluenesulphonic acid are added and the mixture is stirred at room temperature in the absence of oxygen and moisture. After about 45 minutes the reaction mixture is diluted with 450 cc. of chloroform and shaken out thrice with 25 cc. each of water. The organic phase is dried over sodium sulphate and the solvent is evaporated in a vacuum. The resulting yellow oil is chromatographed on 80 g. of silica gel "Merck" for purification. After separating the excess aldehyde with chloroform as eluant, elution with chloroform +1.5% of methanol yields fractions of the condensation product which are uniform in accordance with thin layer chromatography (tested on silica gel plates with chloroform +6% of methanol as eluant). Recrystallization of the primary fractions from chloroform/methanol (1:1) and from pure methanol yields pure 4'-demethyl-epipodophyllotoxin-β-D-(p-methyl-benzylidene)-glucoside having a M.P. of 248–265°, $[\alpha]_D^{23}$=−166.8° (c.=0.791 in pyridine).

EXAMPLE 18

4'-demethyl-epipodophyllotoxin-β-D-(p-isopropylbenzylidene)-glucoside 0.750 g. of dry zinc chloride are added to a solution of 1.5 g. of dry 4'-demethyl-epipodophyllotoxin-β-D-glucoside in 30 cc. of cuminaldehyde, and stirring is subsequently effected in an atmosphere of nitrogen and in the absence of moisture. After about 2½ hours only a small quantity of free glucoside is detected in the thin layer chromatogram (silica gel plates, eluant: chloroform +6% of methanol). Working up is effected by taking up the yellowish suspension in 200 cc. of chloroform, adding 150 cc. of water and shaking thoroughly. The aqueous phase is separated and again extracted twice with 40 cc. each of chloroform. All the chloroform phases are combined, washed thrice with 30 cc. each of water, dried over sodium sulphate and then concentrated by evaporation. The residue, an orange-red oil, is chromatographed on 75 g. of silica gel "Merck." The excess aldehyde may be removed by elution with chloroform. The condensation product is separated from the column with chloroform +2% of methanol. The fractions which are uniform in accordance with thin layer chromatography are dissolved in 25 cc. of methanol and are stirred at room temperature with 700 mg. of active charcoal (Merck p.a.) for 10 minutes. The solution is filtered through talcum, concentrated by evaporation in a vacuum, and the residue is taken up in 5 cc. of acetone. This solution is added dropwise to 75 cc. of pentane, whereby 4' - demethyl-epipodophyllotoxin - β - D -(p-isopropylbenzylidene)-glucoside precipitates as a light rose-coloured powder, having a M.P. of 172–179°, $[\alpha]_D^{23}$= −97.3° (c.=0.958 in chloroform).

EXAMPLE 19

4'-demethyl-epipodophyllotoxin-β-D-(4-hydroxy-3-methoxy-benzylidene)-glucoside 30 g. of vanillin and 6 g. of Dowex ion exchange resin (type 50 WX2, dry) are added to a suspension of 1.5 g. of dry 4'-demethyl-epipodophyllotoxin-β-D-glucoside in 30 cc. of nitromethane and the reaction mixture is shaken in an atmosphere of nitrogen and in the absence of moisture. After about 1½ hours the catalyst is filtered off, the filtrate is diluted with 500 cc. of chloroform and shaken out thrice with 25 cc. each of water. The organic phase is dried over sodium sulphate and the solvent is subsequently evaporated in a vacuum. For purification the residue is chromatographed on 100 g. of silica gel "Merck," whereby chloroform +5% of methanol is used as eluant. The fractions which are uniform in accordance with thin layer chromatography (silica gel plates, chloroform +15% of methanol as eluant) are combined and recrystallized from 15 cc. of hot methanol. 4'-demethyl-epipodophyllotoxin - β - D - (4-hydroxy-3-methoxy-benzylidene)-glucoside is obtained in the form of a colourless crystalline material having a M.P. of 243–250°, $[\alpha]_D^{23}$= −169.9° (c.=0.637 in pyridine).

EXAMPLE 20

4'-demethyl-epipodophyllotoxin-β-D-(2,3-dimethoxybenzylidene)-glucoside 15.0 g. of 2,3-dimethoxy-benzaldehyde and 6.0 g. of dried ion exchange resin (Dowex, type 50 WX2, dry) are added to a suspension of 1.5 g. of 4'-demethyl-epipodophyllotaxin-β-D-glucoside in 30 cc. of nitromethane. After shaking the reaction mixture in an atmosphere of nitrogen in the absence of moisture for 1 hour, a conversion of about 85% can be ascertained in accordance with thin layer chromatography [ thin layer chromatogram control: silca gel plates and chloroform/methanol/water (70:25:5) as eluant]. Working up is effected by filtering off the catalyst and washing out the filter residue with chloroform. The combined filtrates are diluted with 400 cc. of chloroform and shaken out thrice with 25 cc. each of water. After drying over sodium sulphate the organic phase is concentrated by evaporation. The residue is chromatographed on 100 g. of silica gel "Merck," whereby chloroform +2% of methanol is used as eluant. The combined primary fractions, a uniform material in accordance with thin layer chromatography, are taken up in 10 cc. of acetone, and this solution is added dropwise to 100 cc. of pentane, whereby amorphous 4' - demethyl - epipodophyllotoxin-β-D - (2,3-dimethoxybenzylidene) - glucoside precipitates. M.P. 174-177°, $[a]_D^{23}$=−86.1° (c.=0.803 in chloroform).

EXAMPLE 21

4' - demethyl-epipodophyllotoxin - β - D - (2-ethoxy-3-methoxy-benzylidene)-glucoside 0.750 g. of dry zinc chloride are added t a suspension of 1.5 g. of 4'-demethyl-epipodophyllotoxin - β - D-glucoside in 30 cc. of 2-ethoxy-3-methoxy-benzaldehyde, and the mixture is stirred in an atmosphere of nitrogen and in the absence of moisture. After about 2½ hours only a small amount of unconverted glucoside can be detected in the thin layer chromatogram (silica gel plates, eluant: chloroform +6% of methanol). Working up is effected by adding 100 cc. of chloroform and 100 cc. of waters to the suspension and shaking thoroughly. The aqueous phase is subsequently extracted twice more with 30 cc. each of chloroform. All the chloroform phases are combined, filtered over sodium sulphate and subsequently concentrated by evaporation. The residue, a yellow-orange solution, is chromatographed on 75 g. of silica gel "Merck." After eluting the excess aldehyde with chloroform, the condensation product may be removed from the column with chloroform +2% of methanol. The fractions which are uniform in accordance with thin layer chromatography are combined, dissolved in 25 cc. of methanol and stirred at room temperature with a small amount of active charcoal for 10 minutes. After filtering over talcum until clear the light yellow solution is concentrated by evaporation. The resulting yellowish foam is taken up in 5 cc. of acetone and this solution is added dropwise while stirring to 100 cc. of pentane, whereby a flaky percipitate results. After filtering and drying 4'-demethyl-epipodophyllotoxin - β - D - (2-ethoxy - 3 - methoxy-benzylidene) glucoside is obtained as a colourless powder having a M.P. of 166–175°, $[\alpha]_D^{22} = -83.2°$ (c.=0.863 in chloroform).

EXAMPLE 22

4'-demethyl-epipodophyllotoxin-β-D-anisylidene-glucoside 10 cc. of anisaldehyde and 0.25 g. of anhydrous zinc chloride are added to 0.5 g. of dry 4'-demethyl - epipodophyllotoxin-β-D-glucoside and the reaction mixture is shaen in an atmosphere of nitrogen at room temperature. After a reaction period of about 6 hours only traces of the statring material can be detected in the thin layer chromatogram (silica gel plates, eluant: chloroform +6% of methanol). The reaction solution is diluted with 30 cc. of cholroform and washed several times with water. The chloroform phase is dried over sodium sulphate and concentrated by evaporation, whereby an oily residue is obtained. The oil is taken up in 5 cc. of acetone and this solution is added dropwise while stirring to 200 cc. of pentane, whereby the crude condensation product separates as a flaky precipitate. For purification chromatography is effected on 100 g. of silica gel (grain size 0.05 to 0.2 mm.). The primary fractions which are eluated with chloroform +2% of methanol are combined and recrystallized from absolute alcohol. 4'-demethyl-epipodophyllotoxin-β-D-anisylidene-glucoside is obtained as a colourless crystalline material having a M.P. of 248–250°, $[a]_D^{20} = -92.5°$ (c.=0.503 in chloroform).

EXAMPLE 23

4'-demethyl-epipodophyllotoxin-β-D-isopropylidene-glucoside 3.0 g. of anhydrous zinc chloride are added to a mixture of 1.5 g. of dry 4'-demethyl-epipodophyllotoxin-β-D-glucoside in 75 cc. of acetone, and stirring is effected in an atmosphere of nitrogen and in the absence of moisture. The course of the condensation reaction is controlled by thin layer chromatography (silica gel plates, eluant: chloroform/methanol/water (70:25:5) and/or chloroform +6% of methanol). After stirring for about 90-minutes the clear reaction solution is added dropwise to 500 cc. of ice-cold chloroform, and the resulting precipitate is filtered off. The filtrate is washed with water until neutral, is dried over sodium sulphate and concentrated by evaporation. The residue is chromatographed on 100 g. of silica gel (Merck, grain size 0.05–0.2 mm.), whereby chloroform +5% of methanol is used as eluant. The uniform primary fractions are combined, taken up in 10 cc. of acetone, and this solution is added dropwise while stirring to 100 cc. of n-pentane, whereby 4'-demethylepipodophyllotoxin-β-D - isopropylidene-glucoside is obtaiend in the form of colourless flakes. After filtering off and drying an amorphous colourless powder having a M.P. of 173–176° is obtained, $[\alpha]_D^{21} = -106.3°$ (c.=0.938 in chloroform).

EXAMPLE 24

4'-demethyl-epipodophyllotoxin-β-D-cyclopentylidene-glucoside 4 g. of Dowex 50 WX2 ion exchange powder (dried in a high vacuum for 3 hours, dry content 27%) are added to a mixture of 2 g. of dry 4'-demethyl-epipodophyllotoxin-β-D-glucoside in 40 cc. of cyclopentanone, and the mixture is stirred at room temperature in an atmosphere of nitrogen and in the absence of moisture. The course of the condensation reaction is controlled by thin layer chromatography (silica gel plates, eluant: chloroform+15% of methanol). After about 2 hours the catalyst is filtered off. The filtrate is diluted with 500 cc. of chloroform and is then washed several times with water. The organic phase is dried over sodium sulphate and concentrated by evaporation. The resulting residue is chromatographed on 120 g. of silica gel (Merck, grain size 0.05 to 0.2 mm.), whereby chloroform+4% of methanol is used as eluant. Primary fractions are obtained which, however, are not yet completely uniform. To obtain a pure compound chromatography is again effected on 80 g. of silica gel, whereby chloroform+30% of acetone is used as eluant. The fractions which are uniform in accordance with thin layer chromatography are combined and recrystallized from ethanol/ether. Pure 4'-demethyl - epipodophyllotoxin - β - D - cyclopentylidene-glucoside having a M.P. of 176–182°, $[\alpha]_D^{20} = 105.8°$ (c.=0.834 in chloroform), is obtained.

EXAMPLE 25

4'-demethyl-epipodophyllotoxin-β-D-cyclohexylidene-glucoside 20 cc. of cyclohexanone and 0.5 g. of anhydrous zinc chloride are added to 1 g. of dry 4'-demethyl-epipodophyllotoxin-β-D-glucoside, and the mixture is shaken at room temperature in an atmosphere of nitrogen and in the absence of moisture. The course of the condensation reaction is controlled by thin layer chromatography (silica gel plate, eluant: chloroform+6% of methanol). After 2½ hours the clear reaction solution is diluted with 60 cc. of chloroform and is shaken out several times with water. The organic phase is dried over sodium sulphate and concentrated by evaporation in a vacuum. The resulting residue is chromatographed in 100 g. of silica gel (Merck, grain size 0.05 to 0.2 mm.), whereby chloroform+2% of methanol is used as eluant. The uniform primary fractions are combined and are recrystallized from absolute alcohol. 4'-demethyl-epipodophyllotoxin-β-D-cyclohexylidene-glucoside is obtained in the form of colourless crystals having a M.P. of 188–190°, $$[\alpha]_D^{20} = -103.0°$$

(c.=0.515 in chloroform).

EXAMPLE 26

4'-demethyl-epipodophyllotoxin-β-D-benzylidene-glucoside 1 g. of dried 4'-demethyl-epipodophyllotoxin-β-D-glucoside is dissolved in 20 ml. of pure benzaldehyde and after the addition of 0.5 g. of anhydrous zinc chloride shaking is effected on a machine at 20° for 5 to 6 hours in the absence of moisture. The course of the reaction is checked by thin layer chromatography, using silica gel plates and chloroform containing 6% of methanol as eluant. The compound is made visible by spraying the plates with a 1% solution of cerium-(IV)-ammonium nitrate in 50% sulphuric acid and subsequently heating to 100° to 120°. The condensation product is worked up in that chloroform is added to the clear, red-brown coloured reaction solution and shaking out is effected with water. The aqueous phase is again extracted twice with chloroform. All the chloroform phases are combined, washed twice with water, dried over sodium sulphate and the solvent is evaporated in a vacuum. Still adhering benzaldehyde is removed from the resulting oily residue by triturating with pentane until a powdery product is obtained. Further purification is effected in that the benzylidene derivative is taken up in 10 ml. of acetone and the acetone solution is added dropwise whilst stirring to 100 ml. of pentane, whereupon a light yellow or white coloured precipitate is obtained. The crude product may be purified by chromatography on silica gel columns. For this purpose a solution, as concentrated as possible, of 1 g. of the crude benzylidene derivative in a mixture of chloroform+2% of methanol is filtered on a column of 200 g. of silica gel and elution is effected with the same solvent mixture. The fractions which are uniform in accordance with thin layer chromatography are combined and reprecipitated from acetone/pentane. 4'-demethyl-epipodophyllotoxin-$\beta$-D-benzylidene glucoside is obtained as a white powder, having a melting point of 182–185°. After recrystallization from absolute ethanol, crystals having a melting point of 245–246°, are obtained. The optical rotation values are: $[\alpha]_D^{20} = -99°$ in methanol and $-104°$ in chloroform.

EXAMPLE 27

4'-demethyl-epipodophyllotoxin-$\beta$-D-thenylidene-glucoside 10 ml. of pure thiophene-2-aldehyde and 0.25 g. of anhydrous zinc chloride are added to 0.5 g. of dried 4'-demethyl-epipodophyllotoxin-$\beta$-D-glucoside and the mixture is shaken on a machine at 20° in the absence of moisture, whereupon a clear solution is gradually obtained. The course of condensation is checked by thin layer chromatography, as described above. After a reaction period of 3 to 4 hours the solution is diluted with chloroform and shaken out with water. The chloroform phase is washed twice more with a small amount of water and then dried over sodium sulphate and concentrated by evaporation. Excess thiophene-2-aldehyde is removed by dissolving the resulting residue in a small amount of acetone and reprecipitation is effected by adding pentane. Reprecipitation from acetone/pentane is repeatedly effected until the condensation product results in flaky form. Further purification is effected in that the crude product is chromatographed on silica gel. The fractions which are uniform in accordance with thin layer chromatography are combined and yield crystals from absolute alcohol. Pure 4'-demethyl-epipodophyllotoxin-$\beta$-D-thenylidene-glucoside has a melting point of 242–246° (last residue up to 255°) and has an optical rotation of $[\alpha]_D^{20} = -107°$ in chloroform/methanol (9:1).

EXAMPLE 28

4'-demethyl-epipodophyllotoxin-$\beta$-D-furfurylidene-glucoside 10 ml. of pure furfural are added to 0.5 g. of dried 4'-demethyl-epipodophyllotoxin-$\beta$-D-glucoside and after the addition of 0.25 g. of anhydrous zinc chloride shaking is effected on a machine at 20° for 3 to 4 hours in the absence of moisture. The course of the condensation reaction is checked by thin layer chromatography. Thin layer chromatography may be effected on silica gel plates, using chloroform containing 6% of methanol as eluant. The material is made visible by spraying with a 1% solution of cerium-(IV)-ammonium nitrate in 50% sulphuric acid and subsequently heating to 100 to 120°. After condensation has been completed chloroform is added to the green coloured reaction solution and shaking out is then effected with water. The aqueous phase is again extracted twice with chloroform. All the chloroform phases are combined, washed out twice more with a small amount of water, dried over sodium sulphate and the solvent is evaporated in a vacuum at 60°. Adhering furfural is removed by adding the resulting oily residue (about 10 ml.) dropwise to 150 ml. of pentane whilst stirring, whereupon a smeary precipitate is obtained. After decanting the supernatant pentane, the precipitate is taken up in a small amount of acetone and this solution is added dropwise to 150 ml. of pentane. The precipitated, flaky condensation product may be purified by chromatography on silica gel. Chromatography is effected in that a column of 100 g. of silica gel is charged with a concentrated solution of the crude product in chloroform containing 2% of methanol and elution is effected with the same solvent mixture. The main fractions which are uniform in accordance with thin layer chromatography are combined and reprecipitated from acetone/pentane. 4'-dimethyl-epipodophyllotoxin - $\beta$ - D-furfurylidene-glucoside is obtained as a white powder having a melting point of 188–191°. Crystals, having a melting point of 267–269°, are obtained from absolute ethanol. The optical rotation value in chloroform is $[\alpha]_D^{20} = -102°$.

EXAMPLE 29

4'-demethyl-epipodophyllotoxin-$\beta$-D-benzylidene-glucoside 1.0 g. of finely pulverized 4-demethyl-epipodophyllotoxin-$\beta$-D-glucoside is dissolved in 20 mg. of pure benzaldehyde and 2 g. of dried Dowex powder 50 WX 2 are added. The air in the flask is displaced by introducing nitrogen and the reaction mixture is stirred with a magnetic stirrer in the absence of moisture. The course of the reaction is continually checked by thin layer chromatography [system (a) chloroform + 6% of methanol, (b) chloroform/methanol/water (70:25:5)]. After one hour the reaction is completed. Working up is effected in that the catalyst is filtered off from the orange coloured solution and the solution is again washed well with chloroform. The solvent is removed in a vacuum at 50°. An oil is obtained, which is purified on 60 g. of silica gel "Merck" (grain size 0.05 to 0.2 mm.). After separating the benzaldehyde by extraction with chloroform, the compound is eluted with chloroform containing 2% of methanol. This chromatographical purification yields amorphous 4'-dimethyl-epipodophyllotoxin-$\beta$-D-benzylidene-glucoside, which is completely uniform in the thin layer chromatogram. The compound is dissolved in 5 ml. of acetone and added dropwise to 60 ml. of pentane whilst stirring. 4'-demethyl-epipodophyllotoxin-$\beta$-D-benzyldiene-glucoside is obtained as a colourless, amorphous powder, having a melting point of 182–184°. Crystals, having a melting point of 245–246°, are obtained from absolute ethanol. $[\alpha]_D^{20} = -104°$ (c.= 0.766 in. chloroform).

EXAMPLE 30

4'-demethyl-epipodophyllotoxin 2 g. of 4'-demethyl-podophyllotoxin are dissolved in 25 ml. of acetone and 15 ml. of water and after the addition of 5 ml. of concentrated hydrochloric acid heating at reflux is effected for 2 hours. The acid is subsequently neutralised with solid barium carbonate, filtration is effected and the acetone is removed from the filtrate in a vacuum at 40°. The resulting material is taken up in chloroform containing 5% of acetone, the solution is dried over sodium sulphate and concentrated by evaporation in a vacuum. The resulting residue is chromatographed on silica gel with chloroform containing 1% of methanol, whereby a small amount of impurities, then pure 4-demethyl-epipodophyllotoxin and finally unconverted starting material is obtained. The pure fractions of 4-demethyl-epipodophyllotoxin are crystallized from chloroform and methanol. Melting point 228–230°, $[\alpha]_D = -69.8°$ (c.=0.630 in chloroform).

EXAMPLE 31

4'-carbobenzoxy-4'-demethyl-epipodophyllotoxin 60 g. of very finely pulverized 4'-demethyl-epipodophyllotoxin are suspended in 1000 ml. of anhydrous ethylene chloride and after the addition of 19 ml. of absolute pyridine cooling is effected to −10°. A solution of 34 g. of chloroformic acid benzyl ester in 100 ml. of ethylene chloride is added dropwise at −10° whilst stirring during the course of 2½ hours in the absence of moisture and the mixture is then allowed to react for a further half hour. The reaction solution is subsequently washed with water, the organic phase is dried over sodium sulphate, concentrated by evaporation in a vacuum and the residue is dried in a high vacuum at 70–80°. After crystallization of the crude product from acetone/ether and then twice from methanol 4'-carbobenzoxy-4'-demethyl-epipodophyllotoxin, having a double melting point of 117–119°/202–205°, is obtained. The solvent-free form, having a melting point of 201–204°, $[\alpha]_D^{21} = -43.9°$ c.=0.535) in $CHCl_3$, is obtained by drying in a high vacuum, first at 95–100° and then at 130° or by crystallization from acetone/ether.

EXAMPLE 32

Tetra-O-acetyl-4'-carbobenzoxy-4'-demethyl-epipodophyllotoxin-β-D-glucoside 26.8 g. of 4'-carbobenzoxy-4'-demethylepipodophyllotoxin are dissolved in 70 ml. of ethylene chloride whilst heating. The solution is cooled to +15° and 26.0 g. of 2,3,4,6-tetra-O-acetyl-β-D-glucose are added whilst stirring. As soon as most of the tetraacetyl-β-D-glucose has been dissolved, cooling is rapidly effected to −11° to −12° in the absence of moisture. Regardless of small amounts of undissolved starting material, 17.5 ml. of boron trifluoride ethyl etherate (48% $BF_3$) which have been previously cooled to −10°, are then added dropwise at an internal temperature of −10 to −12° during the course of 10 minutes and stirring is subsequently effected at −10° for a further 40 minutes. A mixture of 17.5 ml. of absolute pyridine and 35 ml. of ethylene chloride is subsequently added dropwise whilst stirring and cooling and after the addition of a further 200 ml. of ethylene chloride shaking out is effected four times, each time with 100 ml. of water. After drying over sodium sulphate the organic phase is concentrated by evaporation in a vacuum and the residue dried in a high vacuum at 70°. The crude product is dissolved in 125 ml. of hot ethanol, 375 ml. of water are added whilst stirring and stirring is effected whilst cooling externally with ice water until the initially smeary and lumpy precipitate is converted into a sandy powder. The precipitate is subsequently filtered with suction, washed with a mixture of ethanol and water (1:3) and dried in a high vacuum at 70°. This crude product is dissolved in 300 ml. of hot methanol, a small amount of undissolved flakes is filtered off and the filtrate is concentrated by evaporating in a vacuum. After drying the residue in a high vacuum at 70° tetra-O-acetyl-4'-carbobenzoxy-4'-demethyl-epipodophyllotoxin-β-D-glucoside is obtained as a white foam. $[\alpha]_D^{20} = -41.7°$ ($CHCl_3$). For further purification crystallization may be effected from a mixture of benzene-pentane or benzene-cyclohexane. Pure tetra-O-acetyl-4'-carbobenzoxy-4'-demethyl-epidodophyllotoxin-β-D-glucoside has a melting point of 167–169°; $[\alpha]_D^{20} = -46.6°$ ($CHCl_3$).

EXAMPLE 33

Tetra-O-acetyl-4'-carbobenzoxy-4'-demethyl-epipodophyllotoxin-β-D-glucoside 8.56 g. of 4'-carbobenzoxy-4'-demethylepidodophyllotoxin are mixed by stirring with 55 ml. of acetonitrile at 65° until the material dissolves, 3.92 g. of dry zinc oxide are added and after the addition of 20.0 g. of α-acetobromoglucose stirring is effected at 65° in the absence of moisture. After every 10 minutes a sample is taken and examined by thin layer chromatography (silica gel/chloroform containing 10% of acetone). After all the acetobromoglucose has been converted (about 40 to 60 minutes after the reaction has commenced), cooling is effected to room temperature, dilution is effected with 50 ml. of chloroform, unconverted zinc oxvacuum at 40° to a volume of about 20 ml. This concentrate is dissolved in 250 ml. of chloroform, the chloroform phase is washed twice, each time with 300 ml. of water/methanol (9:1) and after drying over sodium sulphate the chloroform layer is concentrated by evaporation in a vacuum. The dried residue is extracted four times, each time with 70 ml. of a boiling mixture of ethanol/water (1:3). The ethanol-insoluble portion is chromatographed on a 50-fold quantity of silica gel with chloroform/acetone (95:5) as eluant. The pure glucoside fractions are combined and after drying in a high vacuum at 80°, yield crude tetra-O-acetyl-4'-carbobenzoxy - 4' - demethyl - epipodophyllotoxin-O-D-glucoside. A compound having a high degree of purity may be obtained by further chromatography; the physical data of this compound agree with those of the final product described in Example 31.

EXAMPLE 34

4'-carbobenzoxy-4'-demethyl-podophyllotoxin 15.0 g. of 4'-demethyl-podophyllotoxin are dissolved in 450 ml. of a farm mixture of absolute ethylene chloride/tetrahydrofuran (1:1), 6.0 ml. of absolute pyridine are added and cooling is effected to −10°. 8 ml. of chloroformic acid benzyl ester dissolved in 55 ml. of ethylene chloride are then added dropwise whilst stirring and cooling during the course of 1½ hours and stirring is subsequently effected at −5° to −10° for one hour. Concentration is then effected in a vacuum at a bath temperature of 40° to a volume of 200 ml., dilution is effected with 250 ml. of ethylene chloride and the solution is washed once with 100 ml. of 1 N hydrochloric acid, then with water until neutral. After drying over sodium sulphate concentration is effected by evaporating in a vacuum and the residue is chromatographed on a 20-fold quantity of silica gel. Small amounts of by-products and then pure 4'-carbobenzoxy - 4' - demethyl - podophyllotoxin are eluted with chloroform containing 1% of methanol. After crystallization from methanol the compound has a melting point of 113–114°; $[\alpha]_D^{21} = -88.3°$ (chloroform).

EXAMPLE 35

Tetra-O-acetyl-4'-carbobenzoxy-4'-demethyl-epipodophyllotoxin-β-D-glucoside 10.7 g. of 4'-carbobenzoxy-4'-demethyl-podophyllotoxin are dissolved in 30 ml. of ethylene chloride whilst heating, the solution is cooled to +15° and 14.0 g. of 2,3,4,6-tetra-O-acetyl-β-D-glucose are added. After stirring for 5 minutes, cooling is effected to −15° in the absence of moisture and 7 ml. of boron trifluoride ethyl etherate (48% $BF_3$), which have been previously cooled to −10°, are added dropwise during the course of 5 minutes. Stirring is subsequently effected at −15° for one hour, and a solution of 7 ml. of absolute pyridine in 20 ml. of ethylene chloride is then added dropwise. After diluting with 100 ml. of chloroform washing is effected five times, each time with 50 ml. of water. The organic phase is dried over sodium sulphate, concentrated by evaporating in a vacuum and the residue is dried in a vacuum at 60°. The resulting foam is dissolved in 50 ml. of hot ethanol, cooling is effected to about 50°, 150 ml. of cold water are added and stirring is effected until the initially smeary and lumpy precipitate is converted into a sandy powder. The product is filtered with suction, washed with 40 ml. of 25% ethanol and dried in a vacuum at 60°. The compound is then dissolved in 200 ml. of hot methanol, is filtered until clear, the filtrate is concentrated by evaporating in a vacuum and the residue is dried in a high vacuum at 80° until a constant weight is obtained. The resulting tetra-O-acetyl-4'-carbobenzoxy - 4' - demethyl-epipodophyllotoxin - β - D-glucoside is identical with the compound produced in accordance with Example 31.

EXAMPLE 36

Tetra-O-acetyl-4'-demethyl-epipodophyllotoxin-β-D-glucoside

The carbobenzoxy radical is split off from tetra-O-acetyl-4'-carbobenzoxy-4'-demethyl - epipodophyllotoxin-β-D-glucoside in that 13.4 g. of this compound are dissolved in 100 ml. of acetone/ethanol (1:2), 0.5 ml. of glacial acetic acid and 2 g. of palladium/charcoal (with 10% of Pd) are added and hydrogenation is effected at 20°. The catalyst is subsequently filtered off, washed with a warm mixture of acetone/methanol and the filtrate is concentrated by evaporating in a vacuum. 100 ml. of boiling ethanol are poured over the residue, the mixture is allowed to crystallize and after filtering with suction and washing with methanol the crystals are dried in a vacuum. Pure tetra-O-acetyl-4'-demethyl-epipodophyllotoxin-β-D-glucoside crystallizes in the form of fine needles having a melting point of 225–227°, $[\alpha]_D^{21} = -64.4°$ (c.=1.024) in chloroform.

EXAMPLE 37

4'-demethyl-epipodophyllotoxin-β-D-glucoside 25 g. of pure tetra - O - acetyl-4'-carbobenzoxy-4'-demethyl-epipodophyllotoxin-β-D-glucoside, 3.6 g. of anhydrous zinc acetate and 1.45 g. of anhydrous sodium acetate are heated at reflux in 150 ml. of methanol whilst stirring. After 2 hours and after 4 hours 12.5 ml. of methanol are distilled off, 12.5 ml. of methanol are then added after every 2 hours and again distilled off. After a total of 18 hours the splitting off of the acetyl radicals is completed and a mixture of about 60% of 4'-carbobenzoxy-4'-demethyl-epipodophyllotoxin - β - D-glucoside and about 40% of 4'-demethyl-epipodophyllotoxin-β-D-glucoside is obtained. The reaction is checked by thin layer chromatography on silica gel plates using water saturated isopropyl acetate/methanol (4:1) as eluant; development is effected by spraying with a 0.2% solution of cerium-(IV)-sulphate in 50% sulphuric acid and heating to 110–130°. Working up is effected in that 5 ml. of glacial acetic acid are added, concentration is effected in a vacuum at a bath temperature of 50° and drying in a high vacuum at 50° is effected for 15 minutes. The residue is taken up in 250 ml. of chloroform/isopropanol (4:1) and 25 ml. of water, the aqueous phase is separated and the organic phase is again washed with 25 ml. of water. The combined water washings are again extracted with 50 ml. of chloroform/isopropanol and after drying over sodium sulphate the combined organic phases are concentrated by evaporating in a vacuum. The residue is then suspended in 30 ml. of acetone, and the suspension is stirred thoroughly. The acetone is then removed in a vacuum. This procedure is repeated twice more. The residue is then dried in a high vacuum at 75° for 2 hours. 4'-carbobenzoxy-4'-demethyl-epipodophyllotoxin-β-D-glucoside may be obtained in a not quite pure form from the mixture of 4' - carbobenzoxy - 4' - demethyl-epipodophyllotoxin-β-D-glucoside and 4'-demethyl-epipodophyllotoxin-β-D-glucoside by crystallization from methanol. Chromatography on a 100-fold quantity of silica gel and elution with water-saturated isopropyl acetate/methanol (9:1) yields pure 4'-carbobenzoxy-4'-demethyl-epipodophyllotoxin-β-D-glucoside, which has a melting point of 155–156° after crystallization from acetone. $[\alpha]_D^{21} = -92.0°$ (c.=1.00 in chloroform).

The carbobenzoxy radical is split off in that the mixture of 4'-carbobenzoxy-4'-demethyl-epipodophyllotoxin-β-D-glucoside and 4'-demethyl-epipodophyllotoxin-β-D-glucoside is dissolved in 200 ml. of acetone, the solution is added to a suspension of 3 g. of palladium/charcoal (10% Pd) in 50 ml. of water and hydrogenation is effected until the protective radical has been completely split off (1½ hours). The reaction is checked by thin layer chromatography as indicated above. The catalyst is then filtered off, washed with 100 ml. of acetone/water (4:1) and the filtrate is concentrated in a vacuum to a volume of about 40–45 ml., whereupon 4'-demethyl-epipodophyllotoxin-β-D-glucoside already crystallizes. Crystallization is completed by allowing to stand in an ice bath for a further 20 minutes, the resulting crystals are filtered with suction, washed with 25 ml. of water and dried in a high vacuum at 70°. After crystallization from methanol pure 4'-demethyl-epipodophyllotoxin-β-D-glucoside, having a melting point of 225–227°, $[\alpha]_D^{21} = -88.6°$ (c.=1.05 in methanol) is obtained. Another crystalline form thereof has a melting point of 262–264°.

EXAMPLE 38

4'-demethyl-epipodophyllotoxin-β-D-glucoside 2.0 g. of the tetra-O-acetyl-4'-demethylepipodophyllotoxin-β-D-glucoside obtained in accordance with Example 35 and 1 g. of anhydrous zinc acetate are heated at reflux in 30 ml. of absolute methanol for 25 hours. The resulting white precipitate is subsequently dissolved by the addition of a few ml. of glacial acetic acid and heating slightly, the solvent is removed in a vacuum at 40° and the residue is taken up in 50 ml. of chloroform/butanol (4:1). The organic phase is washed twice, each time with 10 ml. of water, after drying over sodium sulphate concentration is effected by evaporating in a vacuum and the residue is chromatographed on silica gel. Non-polar portions and then pure 4'-demethyl-epipodophyllotoxin-β-D-glucoside are eluted with water-saturated isopropyl acetate/methanol (9:1). The individual fractions are examined by thin layer chromatography on silica gel plates, using water-saturated isopropyl acetate/methanol (8:1) as eluant and the glucoside fractions are combined and crystallized twice from methanol. 4'-demethylepipodophyllotoxin-β-D-glucoside has a melting point of 222–230°, another crystalline form thereof has a melting point of 262–264°, $[\alpha]_D^{21} = -88°$ (c.=0.507 in methanol).

EXAMPLE 39

4'-demethyl-epipodophyllotoxin (a) 4'-demethyl-epipodophyllotoxin bromide: 25 g. of podophyllotoxin are dissolved in 200 ml. of ethylene chloride and the solution is saturated with hydrogen bromide gas at 0°. After 15 minutes, washing is effected once with 200 ml. of water, the organic phase is dried over sodium sulphate, filtered and the sodium sulphate washed with 50 ml. of ethylene chloride. 25 ml. of ether are added to the resulting solution of epipodophyllotoxin bromide and after cooling to 0° the solution is saturated with hydrogen bromide gas. The solution is allowed to react at 0° and after 3, 5, 20 and 25 hours saturation with hydrogen bromide gas is again effected. After 28 hours, washing is effected thrice, each time with 400 ml. of water and after drying the organic phase with sodium sulphate evaporation is effected in a vacuum. 40 ml. of warm acetone are poured on the slightly reddish residue, whereby crystallization occurs. Further purification is effected by crystallizing once more from acetone, whereby 4′-demethylepipodophyllotoxin bromide, having a melting point of 180–190°, $[\alpha]_D^{21}=+16.3°$ (c.=0.612 in chloroform) and +15.0° (c.=0.632 in acetone) is obtained. The compound melts with decomposition.

(b) 4′-demethyl-epipodophyllotoxin bromide: 220 g. of pure podophyllotoxin are suspended in a mixture of 2000 ml. of ethylene chloride and 200 ml. of ether. 550 to 570 g. of hydrogen bromide gas are passed through the suspension at 0° during the course of 4 hours, whereby a clear solution results. The solution is allowed to stand at −5° for 23 hours and is then evaporated in a vacuum at a bath temperature of 25–30°. 100 ml. of hot acetone are added to the residue and evaporation is again effected in a vacuum. 300 ml. of a boiling mixture of acetone and ligroin (3.2) are then added, stirring is effected whilst heating on a steam bath until a fine powder results which is allowed to crystallize at 8°. After filtering the precipitate with suction, washing with 300 ml. of acetone/pentane (2:1) and drying in a vacuum are effected. This crude product still contains polar material in accordance with thin layer chromatography and is therefore suspended in 1200 ml. of hot acetone (does not dissolve completely), the volume of the solution is reduced to about 300 to 400 ml. in a vacuum and allowed to crystallize at 8°. After filtering the precipitate by suction, washing with 150 ml. of acetone/pentane (2:1) and drying in a vacuum at 50°, 4′-demethyl-epipodophyllotoxin bromide, no longer containing by-products in accordance with thin layer chromatography, is obtained.

(c) 4′-demethyl-epipodophyllotoxin: 2.3 g. of 4′-demethyl-epipodophyllotoxin bromide are added to a suspension of 2 g. of barium carbonate in 50 ml. of acetone/water (1:1) and stirring is effected at 40° for one hour. The excess barium carbonate is subsequently filtered off, washing is effected with acetone and the acetone is removed from the filtrate in a vacuum at 60°. The resulting crude product is taken up in chloroform containing 5% of acetone, is washed with water and the organic solvent evaporated in a vacuum after drying over sodium sulphate. Crystallization of the residue from chloroform and from methanol or ethanol yields pure 4′-demethyl-epipodophyllotoxin, having a melting point of 228–230°, $[\alpha]_D^{20}=-69.8°$ (c=0.630 in chloroform).

What is claimed is:
1. A compound of formula:

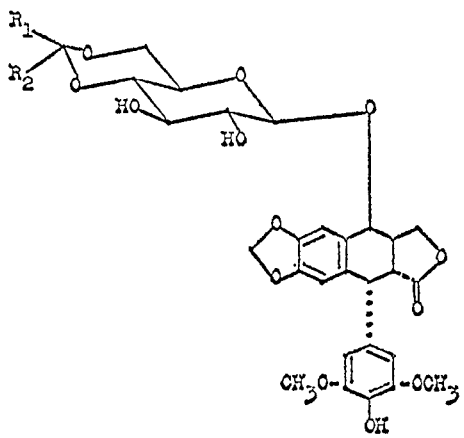

in which $R_1$ is hydrogen, and
$R_2$ is alkyl, alkenyl, cycloalkyl, 2-furyl or 2-thienyl, or aryl, aralkyl or aralkenyl wherein the aromatic ring may optionally be substituted by one or more of hydroxy, alkyl, alkoxy, nitro and halogen, or each of $R_1$ and $R_2$ is alkyl, or
$R_1$ and $R_2$, together with the carbon atom to which they are attached, constitute a saturated cycloaliphatic ring having 5 or 6 ring carbon atoms said alkyl, alkenyl, and alkoxy radicals having no more than 10 carbon atoms and said aralkyl and aralkenyl radicals having no more than 16 carbon atoms excluding any carbon atom-containing substituents in the aromatic ring.

2. A compound according to claim 1, which is 4′-demethyl-epipodophyllotoxin-β-D-ethylidene-glucoside.

3. A compound according to claim 1, which is 4′-demethyl-epipodophyllotoxin-β-D-propylidene-glucoside.

4. A compound according to claim 1, which is 4′-demethyl - epipodophyllotoxin - β - D - hydrocinnamylidene-glucoside.

5. A compound according to claim 1, which is 4′-demethyl - epipodophyllotoxin - β - D - (o-nitro-cinnamylidene)-glucoside.

6. A compound according to claim 1, which is 4′-demethyl - epipodophyllotoxin - β - D - cinnamylidene-glucoside.

7. A compound according to claim 1, which is 4′-demethyl - epipodophyllotoxin - β - D - (p-fluorobenzylidene)-glucoside.

8. A compound according to claim 1, which is 4′-demethyl - epipodophyllotoxin - β - D - salicylidene-glucoside.

9. A compound according to claim 1, which is 4′-demethyl - epipodophyllotoxin - β - D - (m-methoxy-benzylidene)-glucoside.

10. A compound according to claim 1, which is 4′-demethyl - epipodophyllotoxin - β - D - (o-chloro-benzylidene)-glucoside.

11. A compound according to claim 1, which is 4′-demethyl - epipodophyllotoxin - β - D - (m - chloro-benzylidene)-glucoside.

12. A compound according to claim 1, which is 4′-demethyl - epipodophyllotoxin - β - D - (o - methoxy-benzylidene)-glucoside.

13. A compound according to claim 1, which is 4′-demethyl - epipodophyllotoxin - β - D - (p - hydroxy-benzylidene)-glucoside.

14. A compound according to claim 1, which is 4′-demethyl - epipodophyllotoxin - β - D - (o - methyl - benzylidene)-glucoside.

15. A compound according to claim 1, which is 4′-demethyl - epipodophyllotoxin - β - D - (m - hydroxy-benzylidene)-glucoside.

16. A compound according to claim 1, which is 4′-demethyl - epipodophyllotoxin - β - D - (m - nitro-benzylidene)-glucoside.

17. A compound according to claim 1, which is 4′-demethyl - epipodophyllotoxin - β - D - (p - methyl-benzylidene)-glucoside.

18. A compound according to claim 1, which is 4′-demethyl - epipodophyllotoxin - β - D - (p - isopropyl-benzylidene)-glucoside.

19. A compound according to claim 1, which is 4′-demethyl - epipodophyllotoxin - β - D - (4 - hydroxy-3-methoxy-benzylidene)-glucoside.

20. A compound according to claim 1, which is 4′-demethyl - epipodophyllotoxin - β - D - (2,3-dimethoxy-benzylidene)-glucoside.

21. A compound according to claim 1, which is 4′-demethyl - epipodophyllotoxin - β - D - (2 - ethoxy-3-methoxy-benzylidene)-glucoside.

22. A compound according to claim 1, which is 4′-demethyl - epipodophyllotoxin - β - D - isopropylidene-glucoside.

23. A compound according to claim 1, which is 4′-demethyl - epipodophyllotoxin - β - D - benzylidene-glucoside.

24. A compound according to claim 1, which is 4′-demethyl - epipodophyllotoxin - β - D - thenylidene-glucoside.

25. A compound according to claim 1, which is 4'-demethyl - eipipodophyllotoxin - β - D - furfurylidene-glucoside.

References Cited

UNITED STATES PATENTS

| | | | |
|---|---|---|---|
| 2,049,758 | 8/1936 | Bertsch et al. | 260—210 |
| 3,201,385 | 8/1965 | Jarrett | 260—210 |
| 3,296,245 | 1/1967 | Kaiser et al. | 260—210 |
| 3,318,866 | 5/1967 | Hoeksema | 260—210 |

FOREIGN PATENTS 823,068  11/1959  Great Britain.

LEWIS GOTTS, Primary Examiner
J. R. BROWN, Assistant Examiner

U.S. Cl. X.R.

260—340.5, 999

PO-1050
(5/69)

UNITED STATES PATENT OFFICE
CERTIFICATE OF CORRECTION

Patent No. 3,524,844   Dated August 18, 1970

Inventor(s) Camilla KELLER-JUSLEN et al.

It is certified that error appears in the above-identified patent and that said Letters Patent are hereby corrected as shown below:

Col. 1, line 14, after the priority claimed, insert:

--17,232/65, 17,229/65, 17,230/65 and 14,703/66--

Column 9, correct the formula as follows:
From:

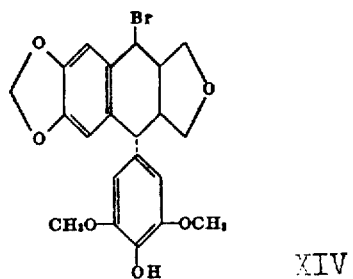

TO:

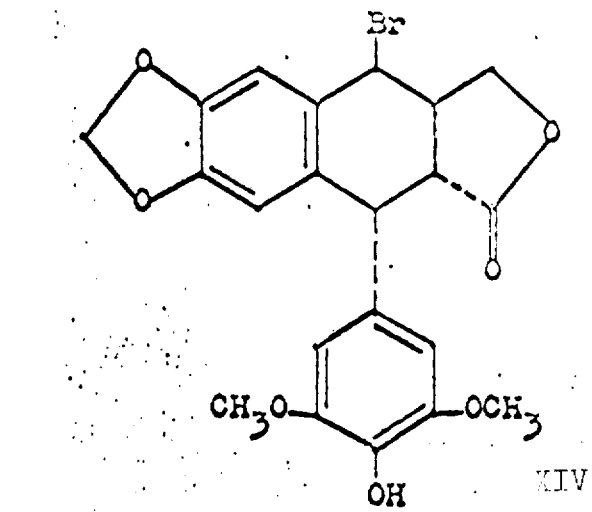

Col. 20, line 42, change "=105.8°" to -- = -105.8° --

Col. 24, line 38, change "farm mixture" to --warm mixture--

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents